Sept. 25, 1962 E. JUNCKER 3,055,092
JACK DEVICE
Filed June 27, 1958

INVENTOR
ERNIE JUNCKER
BY M. Ted Raptes
ATTORNEY

United States Patent Office 3,055,092
Patented Sept. 25, 1962

3,055,092
JACK DEVICE
Ernie Juncker, 8018 Chesterfield, Parma, Ohio
Filed June 27, 1958, Ser. No. 745,071
5 Claims. (Cl. 29—256)

This invention relates to apparatus for disassembling the component parts of an automotive vehicle. More particularly it relates to a jack which can be mounted on a car frame for the purpose of moving the rear axle assembly rearward from the transmission to provide access to the transmission unit.

According to standard shop practice, the rear axle and drive shaft assemblies must be disconnected as a unit and effectively removed before some internal repairs or replacements can be made to the transmission unit. Removal of the rear axle assembly heretofore involved disconnecting the parking brake cable, the brake hose, the links from shock absorber arms, rear stabilizer bar, and at least part of the rear springs depending on the particular car model involved. Because of the numerous component parts to be disengaged, the cost involved in actually repairing the transmission unit frequently represents only a small portion of the total cost of the transmission repair job.

Previous attempts to make some internal repairs on the transmission unit without first disengaging the rear axle assembly, have been unsuccessful due to the force exerted by the rear chassis springs. This force maintains the drive shaft housing flange in abutting relationship with the rear connecting flange of the transmission housing.

Briefly, my invention is directed to an apparatus for removing a drive shaft assembly from operating engagement with the transmission unit comprising a jack assembly, means within said jack assembly for pulling said drive shaft assembly clear of said transmission unit, and means within said jack assembly for lifting said drive shaft assembly.

Accordingly, a primary object of my invention is to provide means for gaining access to the transmission unit without, at the same time, requiring disengagement of the rear axle assembly from the car frame.

Another object of this invention is to provide apparatus for clearing the drive shaft assembly of the transmission housing to permit some internal access to the transmission unit without disengaging the rear axle assembly from the frame.

A further object of this invention is to provide apparatus for jacking the driveshaft and rear axle assemblies rearward and upward from the transmission housing transmission unit.

Figure 1:
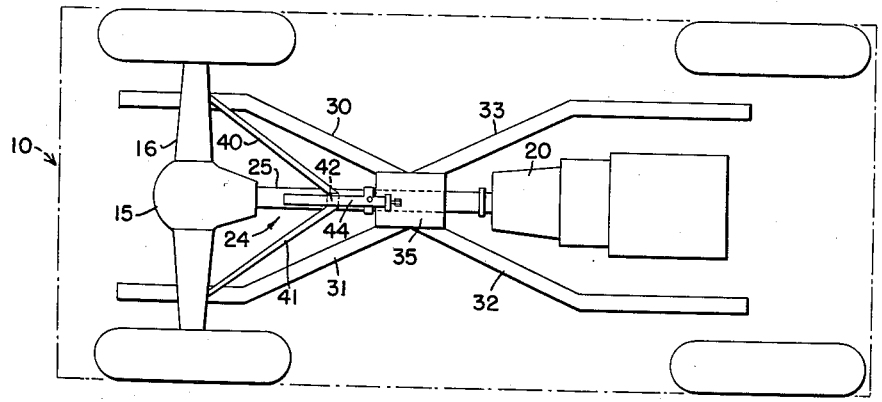
Figure 2:
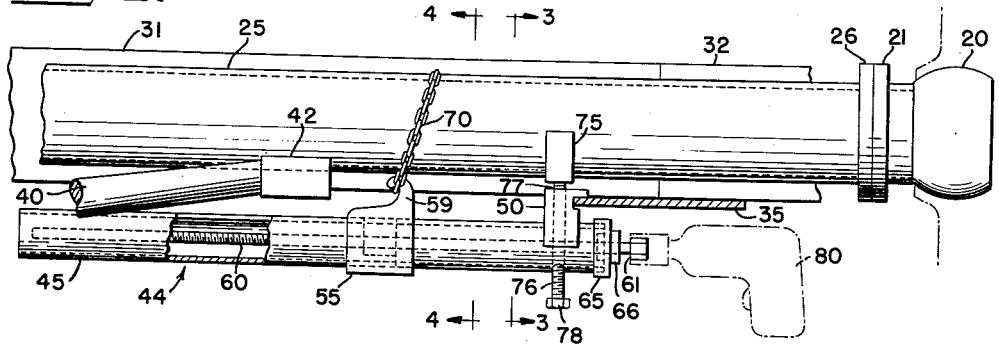
Figures 3, 4:
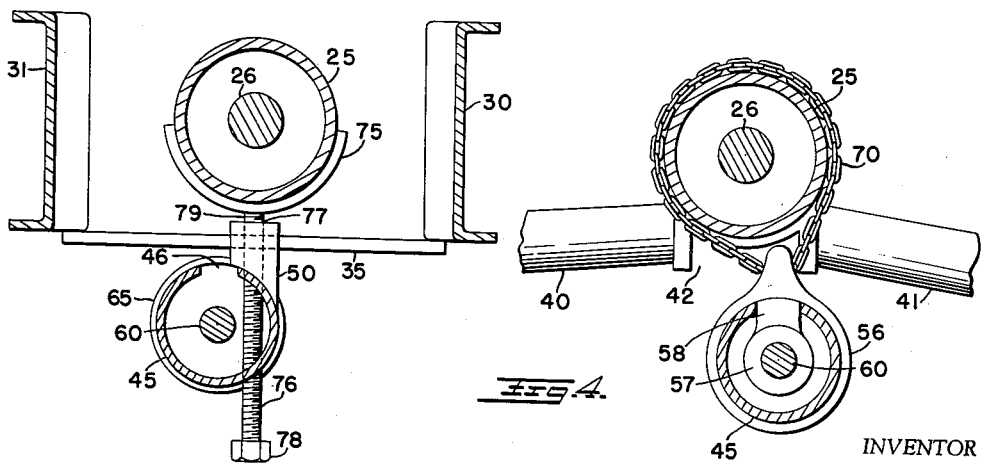

Further objects of this invention will become apparent from a review of the following detailed discussion of one embodiment of my invention and the accompanying drawings, in which:

FIGURE 1 represents a plan view (from underneath) of an automobile chassis showing the location of the various chassis components relative to the transmission unit and driveshaft assembly, and showing the operating position of the novel jacking device of my invention, FIGURE 2 is a side elevation of the drive shaft housing at the location where it connects with the transmission showing the novel jacking device of my invention attached to the car chassis and driveshaft housing in operating position, FIGURE 3 is an enlarged vertical section taken along the line 3—3 of FIGURE 2, and FIGURE 4 is a similar section taken along the line 4—4 of FIGURE 2 but viewed in the opposite direction.

Referring now in detail to the drawings, 10 designates an automobile chassis in which rear axle assembly 15 is connected to the transmission housing 20 through driveshaft housing 25 containing driveshaft 26. A portion of the automobile frame is shown in which frame cross members 30, 31, 32 and 33 are suitably joined to frame plate 35. Rear frame members 30 and 31 are connected to the rear axle assembly through rear chassis springs (not shown). Two rear axle strut rods 40 and 41 form braces between drive shaft housing 25 and the outer ends of the rear axle housing 16 to hold the drive shaft housing square with the rear axle housing. The front ends of strut rods 40 and 41 are riveted or otherwise secured to a strut bracket 42 which is welded to the drive shaft housing 25.

Tube member 45 houses the jack assembly 44 and is provided with an external lug 50 by which the jack assembly 44 is suspended from and supported by the frame plate 35 as shown in FIGURE 2. Tube 45 is provided with a longitudinal opening 46 (FIGURE 3) which permits internal access to tube member 45 and also serves as a guide for traveling member 55. Threaded shaft 60 having drive engaging head bolt 61 is disposed inside tube 45. Shaft 60 is slidably supported within tube 45 by a cap 65 which is securely fastened to the end of tube 45 in any suitable manner. Shaft 60 is adapted for axial rotation within cap 65 by a suitable collar and bearing 66.

Nut member 55 is adapted to be driven longitudinally along tube 45 by the axial rotation of threaded shaft 60. Nut member 55 consists of two concentric hollow cylindrical members, 56 and 57 (FIGURE 4), the innermost of which is internally threaded for driving engagement with threaded shaft 60. Concentric members 56 and 57 are joined by tongue portion 58 which portion is sufficiently narrow to slide longitudinally within tube opening 46 when nut 55 is mounted in driving position on tube member 45. Nut 55 is provided with a hook portion 59 which extends upward to engage chain 70. Chain 70 is secured around drive shaft housing 25 to facilitate control and exert a rearward pull on drive shaft assembly 24 when nut 55 is driven rearward, and contacts strut bracket 42 and strut rods 40 and 41.

Yoke 75 is formed to receive driveshaft housing 25 and acts as a firm bearing point as housing 25 moves rearward or forward. The yoke is adapted to be raised by the upward movement of bolt 76 which is rotatively mounted on the yoke 75 at 79, and in threaded engagement with lug 50 through a threaded opening 77. Bolt 76 is threaded transversely through tube 45 as illustrated in FIGURE 3. Axial rotation of threaded bolt 76 in clockwise direction raises the yoke and drive shaft housing whereas axial rotation in counterclockwise direction lowers the driveshaft housing. Bolt 76 is provided with a suitable head male or female 78 for engaging a rotary drive mechanism or other suitable means.

The object of my invention is to provide means for moving rear axle and driveshaft assembly 16 and 24 rearward (to the left in FIGURE 2) from the transmission unit 20, without disconnecting the rear chassis springs (not shown). However, it is understood that the emergency brake cable and housing (not shown) must be disconnected where mounted in area of drive shaft 24. Also the flange bolts (not shown) which secure components 26 and 21 must be removed to allow for free movement of driveshaft and rear axle assembly in direction desired. This is accomplished with my invention by first fastening chain 70 around drive shaft housing 25. Next, the jack assembly is mounted in parallel position under the drive shaft by positioning lug 50 in supporting engagement with frame plate 35. Thus, the jacking assembly becomes integral with the frame members through engagement of lug 50 with frame plate 35 and the action of the jack assembly moves the drive shaft housing relative to the frame. After mounting the jack on frame plate 35, proper axial rotation of threaded shaft 60 drives nut 55 rearward and causes hook 59 to connect with loop formed by chain 70. Yoke 75 is adjusted for slight contact with drive shaft assembly 25 by proper axial rotation of bolt 76. This provides stationary bearing surface and support for sliding drive shaft housing. When nut 55 is driven sufficiently rearward chain 70 slides rearward along drive shaft assembly 25 and contacts strut bracket 42 and strut rods 40 and 41. Further movement of the nut 55 in the same direction forces the drive shaft assembly and entire rear axle assembly rearward against the resistance of the rear chassis springs. The relative position of the chain 70, hook 59, and strut bracket 42 is best shown in FIGURE 4. Drive shaft assembly 24 need only be moved a relatively short distance rearward to clear drive shaft (not shown) of the rear flange 21 of the transmission unit 20.

With drive shaft clear of transmission housing flange 21, the necessary disconnection of the drive shaft is accomplished, and proper axial rotation of bolt 76 lifts drive shaft assembly 24 and thus permits access to transmission 20 for necessary repairs. FIGURE 3 shows the arrangement of bolt 76 in relation to shaft 60 and yoke 75.

It is to be understood that suitable stops may be provided on the jack assembly as a safety measure to prevent excessive strain on the rear chassis springs. For example, a block could be affixed on tube 45 to limit the rearward movement of nut 55.

Rotary power or impact tool 80 or any other suitable means may be employed to impart rotary motion to threaded shaft 60 for driving nut member 55 horizontally along tube member 45 by engagement with shaft head 61. Likewise, bolt 76 may be rotated with an impact tool or otherwise, to raise and lower yoke 75.

The use of chain 70 is not to be construed as limiting, since other suitable means, e.g. a wire cable, may be used advantageously. Furthermore, any means which suitably engages the nut member 55 with the driveshaft housing 25 to accomplish the desired result, is within the scope of my invention.

Yoke 75 may also be used advantageously, when it is desired to connect the drive shaft housing to the transmission, to lower drive shaft housing 25 and flange 26 into proper alignment with flange 21 by turning bolt 76 in proper axial rotation. Similarly the rearward force exerted against drive shaft assembly 24 may be gradually released by turning shaft 60 in proper axial rotation, thus permitting the force exerted by the rear chassis springs to move drive shaft housing 25 and flange 26 into engagement with flange 21 of the transmission unit.

Although my invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

What is claimed is:

1. Apparatus for removing a drive shaft assembly from operating engagement with the transmission unit comprising in combination a housing, a rotatable threaded shaft mounted within said housing, a nut member adapted to slide along and around the exterior of said housing and engaging said threaded shaft, said nut member being adapted to be driven by rotation of said threaded shaft, means for driving said threaded shaft, said nut member being adapted to engage said drive shaft assembly through intermediate means, means affixed to said housing for supporting said housing, and means affixed to said housing adapted to support and lift said drive shaft assembly.

2. A jack assembly for moving a drive shaft assembly relative to a car frame and out of operating engagement with the transmission unit comprising a housing, a rotatable threaded shaft mounted within said housing, a nut member adapted to slide along and around the exterior of said housing and engaging said threaded shaft, said nut member being adapted to be driven by rotation of said threaded shaft, means for driving said threaded shaft, said nut member being adapted to engage said drive shaft assembly through intermediate means and thereby move said drive shaft assembly away from said transmission, a lug member mounted on said housing for supporting said jack assembly on said car frame, and means rotatably attached to said jack assembly adapted to support and lift said drive shaft assembly.

3. A jack assembly for moving a drive shaft assembly relative to a car frame and out of operating engagement with the transmission unit comprising a housing, a threaded shaft mounted within said housing, a nut member adapted to slide along and around the exterior of said housing and engaging said threaded shaft, said nut member being adapted to be driven by rotation of said threaded shaft, means for driving said threaded shaft, said nut member being adapted to engage said drive shaft assembly through intermediate means and thereby move said drive shaft assembly away from said transmission, a lug member mounted on said housing for supporting said jack assembly on said car frame, said lug member having means rotatably attached thereto adapted to support and lift said drive shaft assembly.

4. Jacking apparatus for removing a drive shaft assembly relative to a car frame and out of operating engagement with the transmission unit comprising a housing which contains a longitudinal slot, a rotatable threaded shaft affixed within said jack housing, a nut member engaging said threaded shaft, said nut member comprising two hollow concentric cylindrical members joined by a tongue portion, said outer cylindrical member being adapted to slide along the exterior of said housing, said inner member being internally threaded and adapted to receive said threaded shaft, said nut member being adapted to be driven by rotation of said threaded shaft within said inner cylindrical member, means for driving said threaded shaft, said nut member being adapted to engage said drive shaft assembly through intermediate means and thereby move same away from said transmission, a lug member mounted on said housing for supporting said jacking apparatus on said car frame, and means rotatably attached to said lug member adapted to support and lift said drive shaft assembly during its removal out of operating engagement.

5. Jacking apparatus for removing a drive shaft assembly relative to a car frame and out of operating engagement with the transmission unit comprising a housing which contains a longitudinal slot, a rotatable threaded shaft affixed within said jack housing, a nut member engaging said threaded shaft, said nut member comprising two hollow concentric cylindrical members joined by a tongue portion, said outer cylindrical member being adapted to slide along said housing, said inner cylindrical member being internally threaded and adapted to receive said threaded shaft, said nut member being adapted to be driven by rotation of said threaded shaft within said cylindrical member, means for driving said threaded shaft, said nut member being adapted to engage said drive shaft assembly through intermediate means and thereby move same away from said transmission, rotatable means affixed to said housing adapted to support and lift said drive shaft assembly, and a lug member mounted on said housing for supporting said jacking apparatus on said car frame.

References Cited in the file of this patent

UNITED STATES PATENTS

| | | |
|---|---|---|
| 889,315 | Kenyon | June 2, 1908 |
| 1,220,911 | Valentine | Mar. 27, 1917 |
| 1,305,805 | Jones | June 3, 1919 |
| 1,927,688 | McKee | Sept. 19, 1933 |
| 2,514,374 | Cooper | June 11, 1950 |
| 2,663,542 | Lincoln et al. | Dec. 22, 1953 |
| 2,895,712 | Stovern et al. | July 21, 1959 |